US008248060B2

(12) United States Patent
Schweitzer, III et al.

(10) Patent No.: US 8,248,060 B2
(45) Date of Patent: Aug. 21, 2012

(54) POWER ANGLE MONITOR

(75) Inventors: Edmund O. Schweitzer, III, Pullman, WA (US); David E. Whitehead, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 715 days.

(21) Appl. No.: 12/247,866

(22) Filed: Oct. 8, 2008

(65) Prior Publication Data

US 2009/0091303 A1 Apr. 9, 2009

Related U.S. Application Data

(60) Provisional application No. 60/978,634, filed on Oct. 9, 2007.

(51) Int. Cl.
*G01P 3/42* (2006.01)
(52) U.S. Cl. ........................................ 324/160
(58) Field of Classification Search .............. 324/66, 324/160; 322/20, 44, 99; 702/72; 361/20
See application file for complete search history.

(56) References Cited

U.S. PATENT DOCUMENTS

| | | | | |
|---|---|---|---|---|
| 3,921,047 A * | 11/1975 | Carter et al. | ............... | 388/844 |
| 4,142,591 A | 3/1979 | Himmelstein | | |
| 4,229,694 A * | 10/1980 | Wilson et al. | ............... | 361/20 |
| 4,450,403 A * | 5/1984 | Dreiseitl et al. | ............... | 324/166 |
| 4,463,306 A | 7/1984 | De Mello | | |
| 4,506,339 A * | 3/1985 | Kuhnlein | ............... | 702/146 |
| 4,991,429 A * | 2/1991 | Stacey et al. | ............... | 73/114.59 |
| 5,793,750 A | 8/1998 | Schweitzer | | |
| 6,476,521 B1 | 11/2002 | Lof | | |
| 6,642,700 B2 * | 11/2003 | Slade et al. | ............... | 324/66 |
| 6,662,124 B2 | 12/2003 | Schweitzer | | |
| 6,845,333 B2 | 1/2005 | Anderson et al. | | |
| 6,934,654 B2 | 8/2005 | Benmouyal | | |
| 6,947,264 B2 | 9/2005 | Gill | | |
| 6,947,269 B2 | 9/2005 | Lee | | |
| 2002/0033052 A1 * | 3/2002 | Kondo et al. | ............... | 73/800 |
| 2006/0100819 A1 | 5/2006 | Grant | | |

OTHER PUBLICATIONS

Demetrios A. Tziouvaras, Daqing Hou, Schweitzer Engineering Laboratories, Inc., Out-Of-Step Protection Fundamentals and Advancements, 2003.
GMM, Optical Pick-Up (OPU) Specifications & Hook-Up, Oct. 3, 1995.

(Continued)

*Primary Examiner* — Julio Gonzalez
(74) *Attorney, Agent, or Firm* — Richard M. Edge

(57) ABSTRACT

A system and method for monitoring the rotation of a generator rotor and calculating a power angle using an optical rotor displacement monitor. The monitor uses a light beam directed toward the rotor to detect a marking thereon, and generates an electrical pulse when the marking is detected. The time between the pulse and a reference point (such as a zero crossing) of the signal waveform from the terminals of the generator is used to calculate the power angle of the generator. The system is adaptive in that it can account for new markings on the rotor. The system may be connected to a network so that power angles from various generators on the electrical network may be compared. The system may further be connected to a common time source such that a time stamp may be applied to the power angles from various generators, allowing for more accurate comparison of the power angles.

27 Claims, 10 Drawing Sheets

OTHER PUBLICATIONS

Encoder Design Guide, Optical Encoder Design and Operation, Nov. 11, 2004.

Optical Encoder Design and Operation, Apr. 1, 2005.

Patent Cooperation Treaty, International Search Report PCT/2008/079228, Dec. 8, 2008.

Patent Cooperation Treaty, Written Opinion of the International Searching Authority, Dec. 8, 2008.

Stephen Petronic, Optical Rotary Encoder Basics, Design News for Mechanical and Design Engineers, Apr. 21, 2002.

* cited by examiner

POWER ANGLE MONITOR

CROSS REFERENCE TO RELATED APPLICATIONS

This application claims benefit under 35 U.S.C. §119(e) of U.S. Provisional Application entitled "POWER ANGLE MONITOR", filed on 9 Oct. 2007, having Ser. No. 60/978,634, naming Edmund O. Schweitzer, III and David E. Whitehead as inventors, the complete disclosure thereof being incorporated herein by reference.

TECHNICAL FIELD

This disclosure relates to monitoring the rotation of a generator rotor. More particularly, this disclosure relates to monitoring the rotation of the rotor using a light source and light detector for detecting markings on the rotor. This disclosure also relates to calculating the power angle of the generator and using power angles of several generators in a power system for control, automation, or protection.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1B:
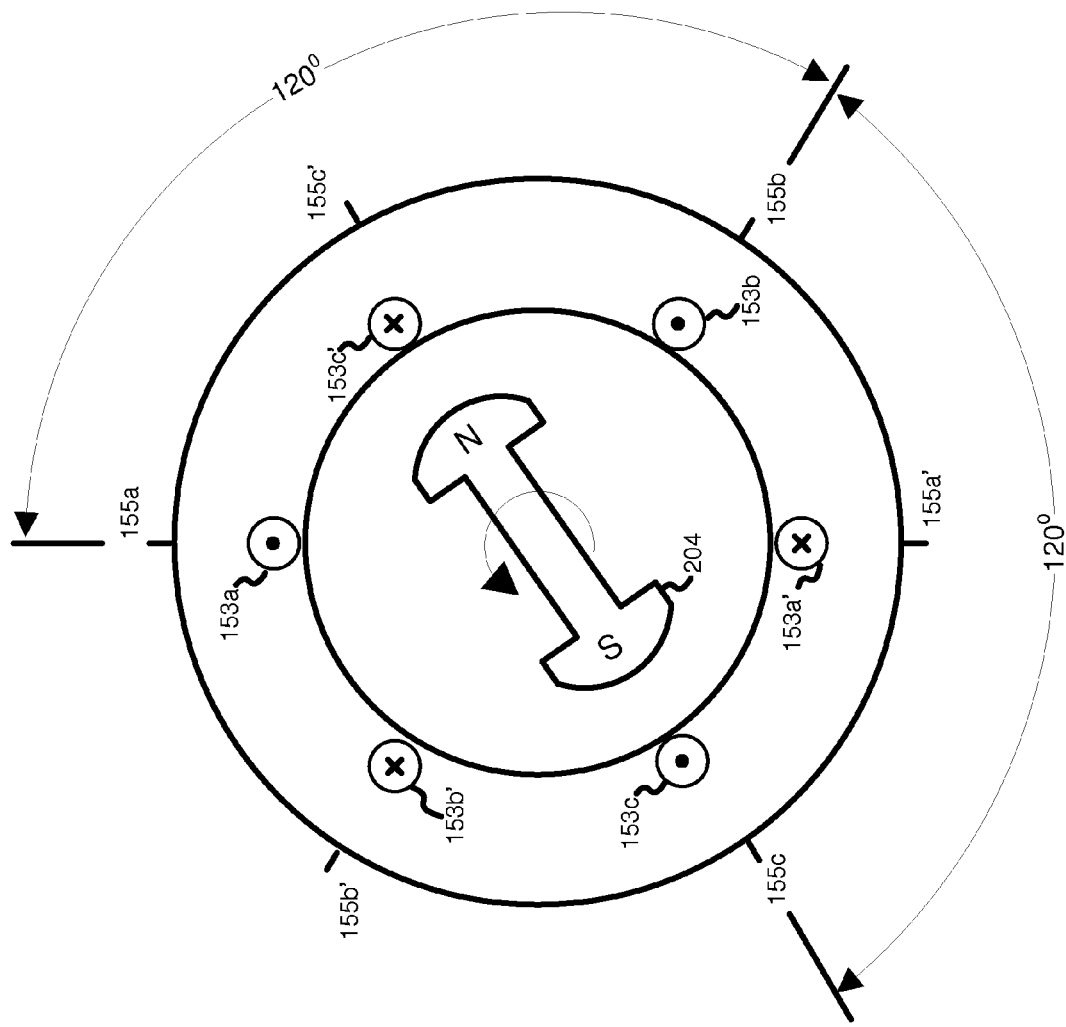
FIGS. 1A and 1B illustrate cross-sections of a synchronous generator.

In an electrical power system information about the power angle (sometimes referred to as a rotor angle) of a generator is beneficial for providing appropriate power system control, automation, and protection. In particular, information about the power angle influences decisions on power generator levels, load shedding or adding, islanding, joining electrical networks, and so forth. Such changes to the network may drive a generator to instability for certain conditions of the power angle of the particular generator. As a result, to maintain stability, information concerning the power angle of a particular generator is important in power system protection, automation, or control.

In some conventional generators, the rotor is monitored using a disc installed thereon and a reader that reads the angular position of the disc. For example, the disc may include either apertures or markings that are read by the reader to determine the angular position of a rotor. However, conventional systems are difficult to install because the disc must be installed around the rotor, the rotor must be stopped to install the disc, and conventional receivers typically do not allow for changes in the markings on the disc, whether the changes are intentional or not. Because of the disc and the optical readers, conventional systems also take up significant space on the generator.

The power angle monitor disclosed herein may be used with a variety of power generators that include a rotor. The rotor angle monitor may also be used in power systems that include multiple generators for coordination of power output, which directly relates to the power angles of the generators and for various protection, automation, or control schemes used with the power system.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Power Angle Determination

Electrical generators are used in electrical power networks to provide power to the electrical network. Several types of generators are used, most of which include a rotor that is caused to rotate by a mechanical force or prime mover provided by, for example, wind flow, water flow, steam flow, torque from an engine, or the like. One particular type of generator is a synchronous generator. Synchronous generators are used in electric utility systems to convert mechanical rotation into alternating electric current via well-known electromagnetic principles. After suitable conditioning, the alternating electrical current is typically transmitted and distributed to a variety of power system loads within the electric network.

Figure 1A:
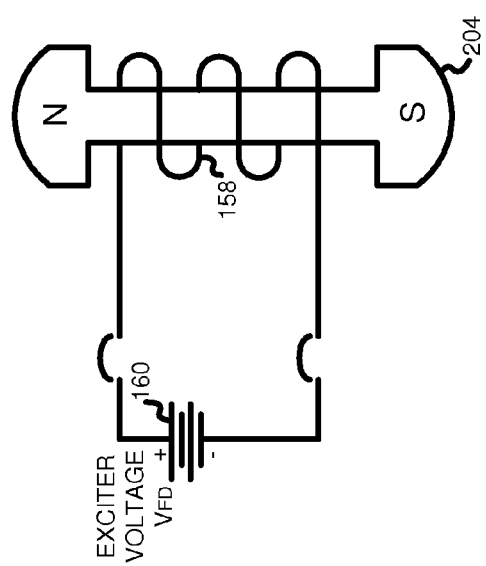

As is known, and as illustrated in FIGS. 1A and 1B, synchronous generator design is based on Faraday's law of electromagnetic induction and includes a rotating rotor 204 driven by an external torque for inducing an electromagnetic field (EMF) in a stationary stator. The rotor 204 includes a field winding 158 wrapped around a rotor body, and the stator includes an armature winding wrapped around an armature body.

In operation, a direct current is made to flow (using, for example, and exciter voltage 160) in the field winding 158 to generate a magnetic field. When the rotor 204 is made to rotate, the magnetic field rotates with it, passing the stator winding(s) and inducing a time-varying electric current therein.

FIG. 1B illustrates a 3-phase synchronous generator operating under the principles stated above. The generator includes three windings 153a to 153a', 153b to 153b', and 153c to 153c'. The stators are each separated by 120° such that when the electrical field associated with the rotor 204 passes the stator, each electrical current induced in the terminal pairs 155a and 155a', 155b and 155b', and 155c and 155c' of each stator is separated by 120 electrical degrees. As the poles of the electrical field associated with the rotor 204 pass the stators, the voltage present on the terminals of the stators oscillates, and an alternating current results.

The period ($T_I$) of the resulting alternating current from a synchronous generator with N poles, and which has a period of rotation of $T_G$ can be calculated using the formula:

$$T_I = NT_G$$

The alternating current from the illustrated generator will have a period equal to the period of rotation of the rotor because the generator rotor includes a single pair of poles. The present invention may, however, be applied to any rotor regardless of the number of phases or pairs of poles. Thus, the mechanical angular position of the rotor 204 is related to the time-varying electrical output of the terminals 155a-155c. As described below, however, this relationship can be influenced by, for example, an electrical load on the terminals of the generator. This relationship can be monitored during operation of the generator by monitoring the power angle of the generator.

Power angle is the angle between the axis of a generator rotor and the resultant magnetic field axis. The position of the generator rotor axis is a function of the mechanical power input on the generator, which causes a torque on the rotor. Under normal operating conditions, and equal but opposite electrical torque is also placed on the rotor due to the electric output from the generator. In conditions where the mechanical torque and the electrical torque fall out of balance, the power angle may shift or oscillate, depending on the magnitude of the unbalance.

Figure 2:
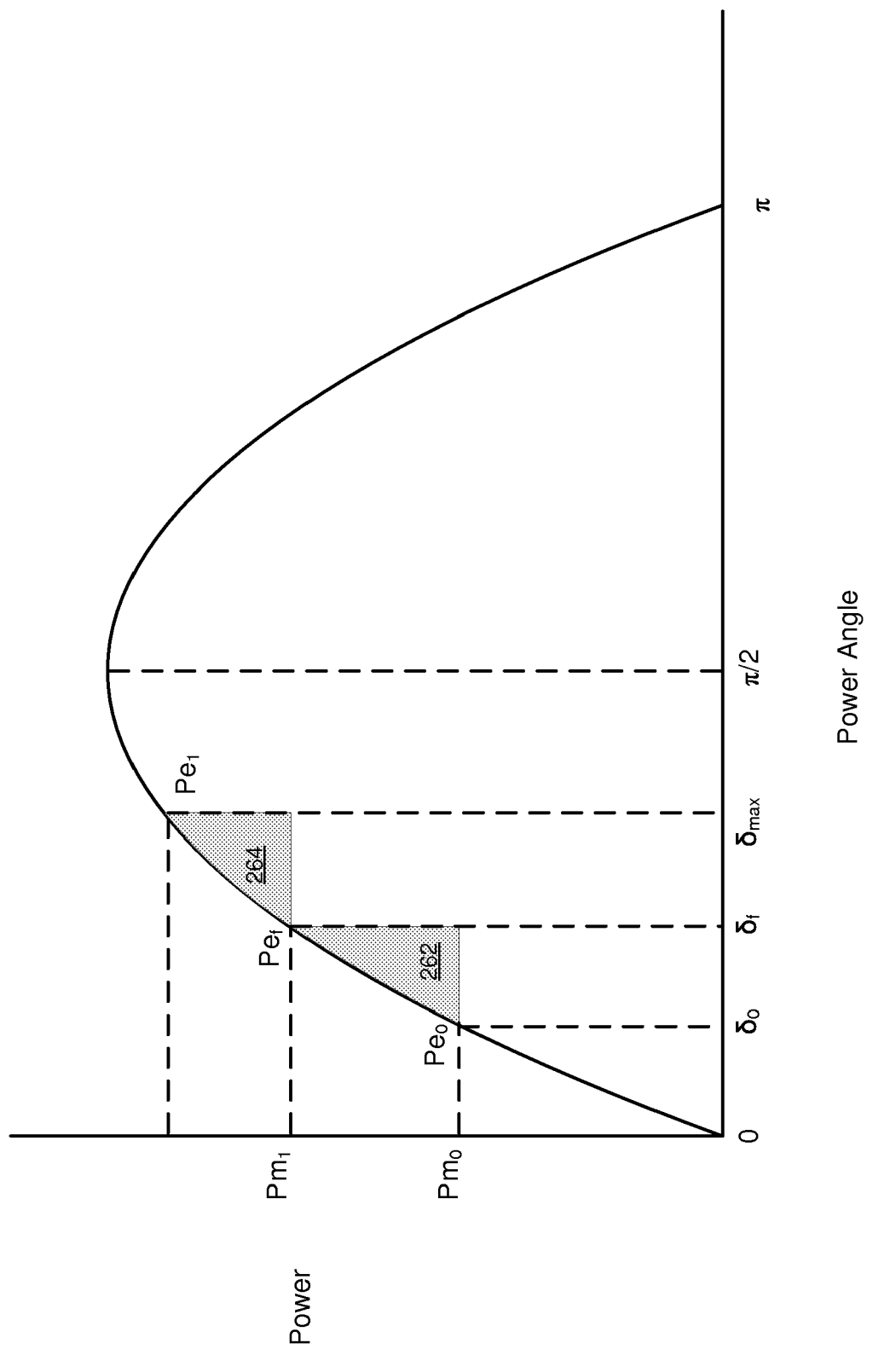
FIG. 2 is a power angle curve for an exemplary power generator.

FIG. 2 is one illustration of a power angle curve that shows the relationship between the power angle (d) and the input mechanical power ($P_m$). Under balanced conditions, the mechanical power input $P_{mo}$ results in a balance point a and power angle $d_0$. For a situation where the electric torque that balances the mechanical torque decreases (for example, an increase in the mechanical power or a fault that decreases the electric power from the generator), the mechanical torque causes the rotor to rotate at an increased rate, causing the power angle to increase. In FIG. 2, the mechanical power is increased to $P_{m0}$ from $P_{m1}$, resulting in an increase in the power angle. Though the resultant electrical torque would balance the new mechanical torque at point b, the inertia of the rotor would continue to increase the power angle to, for example, $d_{max}$ at point c. In a stable system, the rotor would experience negative acceleration, and eventually come to balance point b at power angle $d_f$. For a stable system, the area swept between the power angle curve between points a and b 262 will equal the area swept between the power angle curve between points b and c. This is the so-called equal-area criterion. That is, for a generator to remain stable, a disturbance must satisfy the equation:

$$\int_{\delta_0}^{\delta} (P_c - P_m) d\delta = 0$$

If the step increase of the disturbance is too large, the system could go unstable. Knowing the maximum power angle $d_{max}$ allows operators to know how much power can be safely produced without causing an increased demand on the generator in an unstable condition. As represented in FIG. 2, area 262 represents the kinetic energy gained during acceleration between points a and b, where area 264 represents kinetic energy lost during deceleration between points c and b.

It should also be noted that in an improperly damped system, the power angle may oscillate between points a and c around point b for the disturbance step change from mechanical power increase from $P_{mo}$ to $P_{m1}$. In typical power systems, however, damping is present in the form of resistances, field flux variations and rotor damper windings, all of which assist in damping the oscillations such that the system settles at balance point b.

A. Monitoring the Mechanical Angular Position of the Rotor

A power angle can be determined using information about the angular position of the rotor and a signal waveform such as from a voltage output of the generator. The angular position of the rotor can be determined using the system illustrated in FIG. 3. According to this system, a rotor 204 rotates about its axis. Present on the surface of the rotor 204 are a plurality of markings 206. The markings may include scratches on the rotor 204, either intentionally or unintentionally made, a reflective marking such as tape or paint, a code attached to the rotor such as a bar code, or the like. A light 212 from source 208 is directed toward the rotor 204 at a particular longitudinal position along the length of the rotor 204. The light source 208 may be any capable of providing a reflected reading from the rotor 204, and may include a laser, a light emitting diode (LED), or the like. As the rotor 204 rotates, the markings cause changes in the amount of the reflected light from the light source 208, to the light detected by a sensor 216. A sensor 216 receives the reflected light information from the rotor 204. The sensor 216 may be capable of receiving the reflected light information from the rotor 204 and may include a photo transistor or the like. The output of the sensor 216 is transmitted over a link 224 to a controller 228. The controller 228 produces an analog or digital record 237 of the sensor's 216 signal. Thus, a marking profile is created that corresponds with the marks detected on the rotor. This marking profile 237 is repeated for each complete revolution of the rotor 204 as long as no new markings are added to the rotor. The marking profile 237 is stored within a storage medium 232, which may be analog or digital, but is preferably a non-volatile digital medium such as a FLASH memory or a hard disk. As the controller 228 receives output from the sensor 216 it compares the output to the marking profile 237 such that any additional markings detected may be added to the marking profile 237.

The pattern repeats identically unless new markings are made. For example, a new scratch may appear on the rotor 204. These new markings result in a new marking profile 237. Program 232 is adaptable such that it can recognize and accept new markings on the rotor 204, and update the marking profile 237.

Any one of the particular parts of the reference pattern can be selected for the reference marking. A digital rotor pulse 236 is generated by the controller 228 when the reference marking is recognized during each revolution of the rotor. The digital rotor pulse 236 can be used along with the voltage of the generator to obtain the power angle of the generator.

As described above, a three-phase generator will include three sets of terminals 352, 354, and 356. Voltage signal waveforms are sampled from each of these terminals by the controller 228 using voltage transformers (potential transformers or similar devices) 358a, 358b, 358c.

B. Calculating the Power Angle

Figure 4:
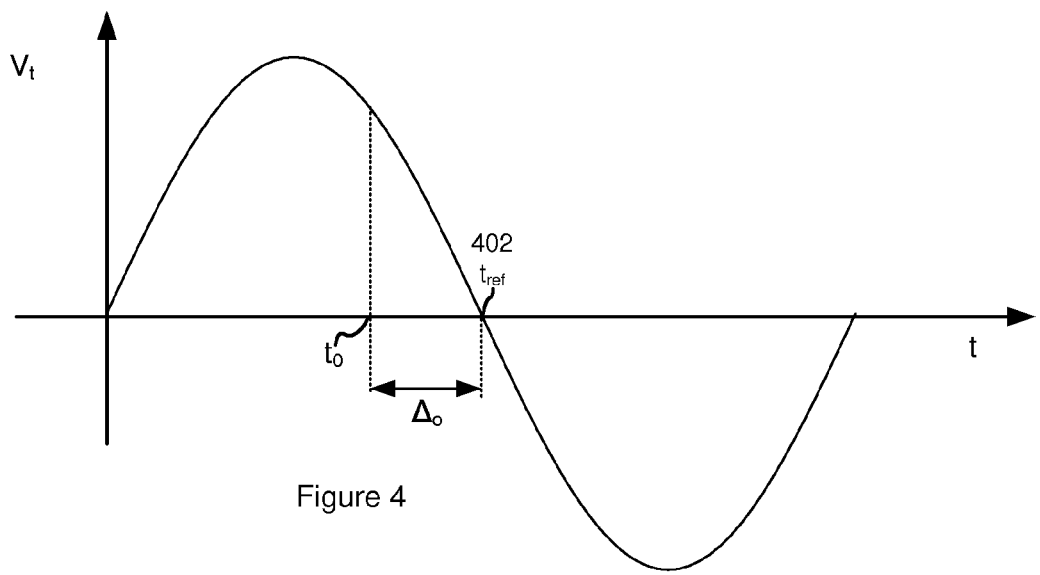
FIG. 4 is a graph illustrating power angle determination.

FIG. 4 illustrates a signal waveform generated by a generator consisting of a terminal voltage ($V_t$) of one pair of the terminals (corresponding with one phase) of the generator over time. Under no load or an open circuit condition (OCC), the power output of the generator will be zero, and the power angle will be zero. Under such conditions, we can take a reference point when the voltage crosses zero, such as a reference point $t_{ref}$ 402 (though this embodiment is described in terms of a zero crossing, any particular reference point may be used, such as a particular angle on the signal waveform, using the systems and methods described herein). It should be noted that the reference point $t_{ref}$ 402 may also be referred to as a reference time. Point to indicates the voltage at the point that the rotor pulse 236 (corresponding to a particular position of the rotor) is generated by the controller 228 when there is no load connected to the generator (i.e. OCC). This can be measured, for example, by opening the circuit breaker connecting the generator to the power system. With the rotor 204 rotating at a synchronous speed, the time between the rotor pulse 236 and the reference point $t_{ref}$ 402 will be constant during the OCC. Either the positive-slope or negative-slope zero crossing may be used for the reference point $t_{ref}$ 402. In one embodiment, it is the same (positive-slope or negative-slope) zero crossing used throughout. When there is a load connected to the generator, however, the position of the rotor pulse $t_1$ with respect to the reference point $t_{ref}$ 402 changes.

Figure 5:
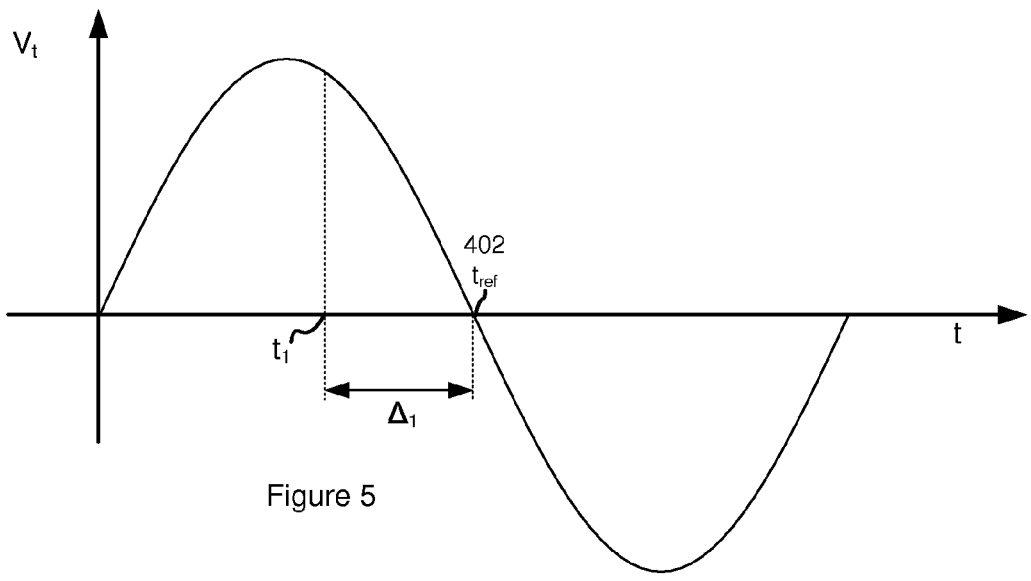
FIG. 5 is a graph illustrating power angle determination.
Figure 6:
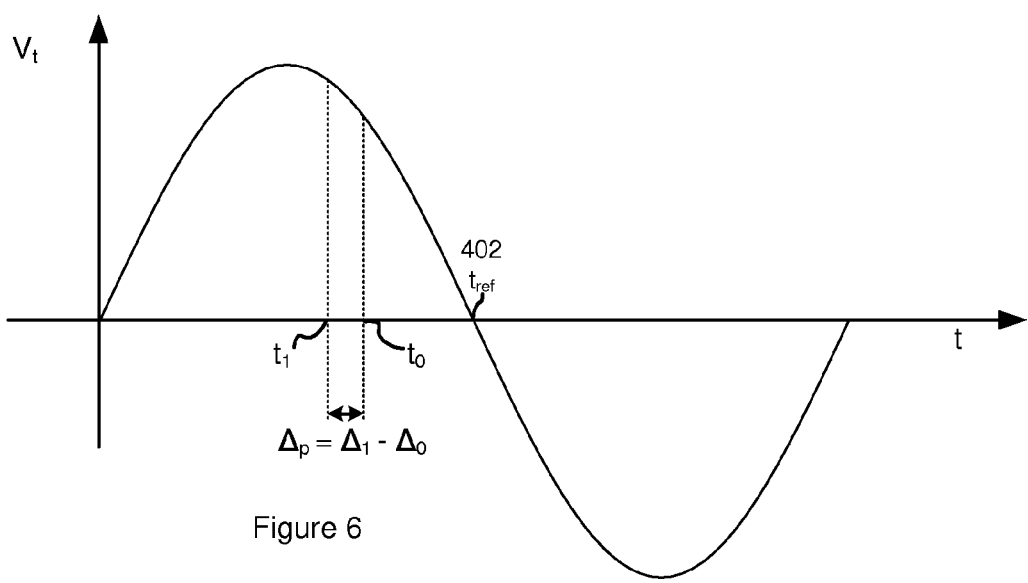
FIG. 6 is a graph illustrating power angle determination.

As can be seen in FIG. 5, when the generator is connected to a load, the rotor pulse is generated at a different voltage, as indicated by $t_1$. In effect, the rotor pulse shifts with respect to the zero-crossing of the output voltage of the generator. The shift can be measured using a reference point $t_{ref}$ 402 of the output voltage of the generator. As seen in FIG. 6 and the calculation below, $\Delta_p$ is the power angle of the generator.

With the gathered information, the power angle d can be calculated using the equation:

$$\delta = \frac{\Delta_1 - \Delta_0}{T} * 2\pi$$

where T is the period of the rotor, $\Delta_1$ is the time between the rotor pulse $t_1$ and the reference point 402 when the generator is connected to the load, and $\Delta_0$ is the time between the rotor pulse to and the reference point $t_{ref}$ 402 during OCC. For example, for a 60 Hz power system, T=16.67 ms, and assuming that $\Delta_0$=3 ms and $\Delta_1$=4.5 ms, then the power angle d is 0.18p (or 32.4°). Calculating the power angle in this manner yields an accurate power angle when the frequency of the power system does not change between the time when $\Delta_0$ is calculated and the time that the power angle is calculated. Using the calculated power angle, operators can make better-informed decisions for power system automation, control, or protection.

In the case where the period of rotation is not constant, a compensation may be made for the change in period by multiplying $\Delta_0$ by a compensation factor m. The compensation factor may be calculated by comparing the two periods:

$$m = \frac{T_1}{T_0}$$

where $T_0$ is the period of rotation for the rotor during the OCC condition (when $\Delta_0$ is measured), and $T_1$ is the period of rotation for the rotor when the power angle is determined (when $\Delta_1$ is measured).

Using the compensation factor m, the power angle can be determined using the equation:

$$\delta_p = \frac{\Delta_1 - m\Delta_0}{T_1} 2\pi = \frac{\Delta_1 - \Delta_0\left(\frac{T_1}{T_0}\right)}{T_1} 2\pi$$

Because the period of rotation T is needed to calculate the power angle, the system constantly measures either the frequency or the period of the rotor. This may be performed using zero crossings (such as voltage zero crossings) by, for example, measuring the time between each zero crossing and multiplying by two or measuring the time between each negative zero crossing or between each positive zero crossing. This may be performed using the physical rotation of the rotor by, for example, measuring the time between each rotor pulse. Further, the period may be calculated using the frequency (the period being the reciprocal of the frequency), which may be available to the controller 228 from other operations or calculations made by the controller. There are further methods of calculating the period of rotation, any of which may be used as needed.

Figure 7:
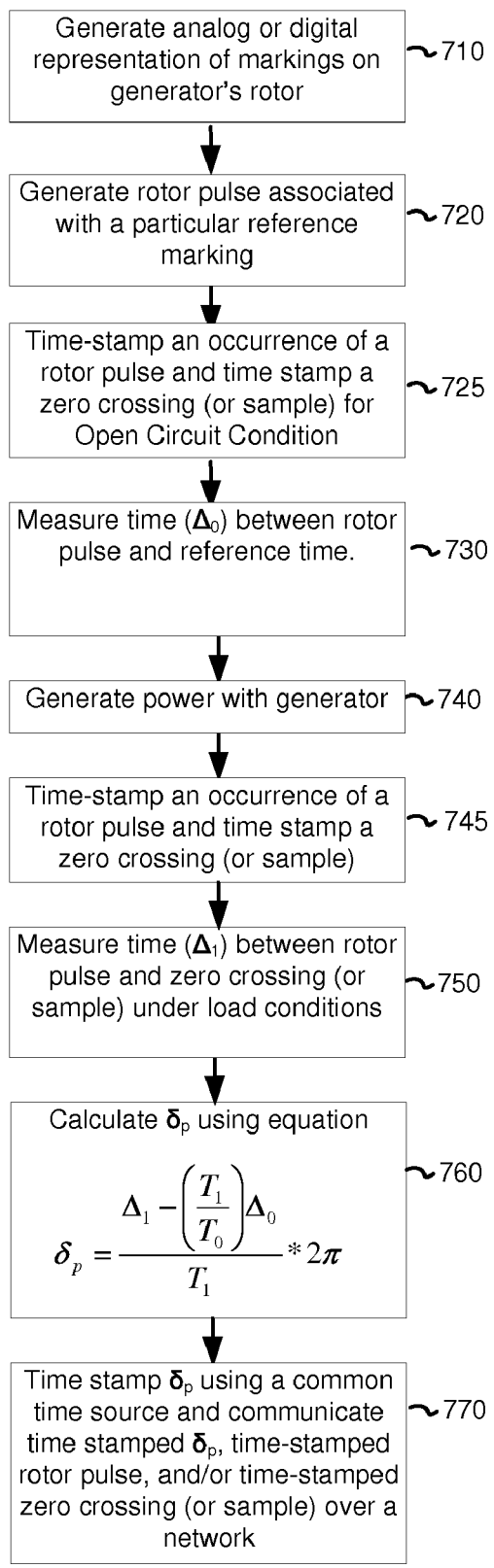
FIG. 7 is a flow chart illustrating a power angle calculation for a generator.

FIG. 7 illustrates a summary of the method that may be used to determine the power angle of a generator using the disclosed method and apparatus. As described above, the system generates an analog or digital representation (marking profile) of markings on the selected circumferential section of a generator rotor 710. A reference mark is selected from within the marking profile, and a rotor pulse that is associated with the detection of that reference mark is generated for each rotation of the rotor 720, and may be time-stamped 725 using the common time reference. Throughout, the period of rotation of the rotor is measured for each rotation of the rotor using the rotor pulse. The period may be measured by measuring the time between rotor pulses. In the example where the reference pulse and the rotor pulse are time stamped, the time between the reference pulse and the rotor pulse may be calculated using subtraction. Alternatively, a timer may be started when either the reference pulse or the rotor pulse occurs, and end when the other of the reference pulse and the rotor pulse occurs, resulting in the time between the rotor pulse and the reference pulse. During OCC, a time between the rotor pulse and a reference point (either positive-slope or negative-slope) is measured 730, and the period of rotation for this time is measured and recorded. Alternatively, and as discussed in conjunction with FIG. 9A, a reference point on a signal waveform other than a zero crossing (such as a sample time) may be used. The generator is then connected to a load such that power is generated 740. The rotor pulse and the zero crossing (or other reference point on a signal waveform such as a sample time) are time stamped 745. The time between the rotor pulse and the zero crossing (the same-sloped zero crossing as used in step 730) is measured 750, and the period of rotation is also measured and recorded. As above, in the example where the reference pulse and the rotor pulse are time stamped, the time between the reference pulse and the rotor pulse may be calculated using subtraction. Alternatively, a timer may be started when either the reference pulse or the rotor pulse occurs, and end when the other of the reference pulse and the rotor pulse occurs, resulting in the time between the rotor pulse and the reference pulse. The power angle $d_p$ is then calculated using the recorded times and periods of rotation 760. As described below, the power angle may be time stamped with a common time and shared across a network 770. Further, the time-stamp of the rotor pulse, the time stamp of the zero crossing (or other reference point on the signal waveform) may also be shared over the network.

The method described above essentially measures a "shift" (or rotation or angular change) in the position of the rotor pulse in relation to the reference point. That is, when the generator begins to generate power (i.e. a load is connected to the generator), the electrical angle between the rotor pulse and the reference point shifts. The shift can be used to determine the power angle of the generator as it generates power using the above equation. Thus, an optical rotor monitor is used to determine a shift in the position of the rotor pulse in relation to the reference point such that the power angle of the generator may be calculated and monitored.

C. Power Angles on an Electrical Network

Figure 8:
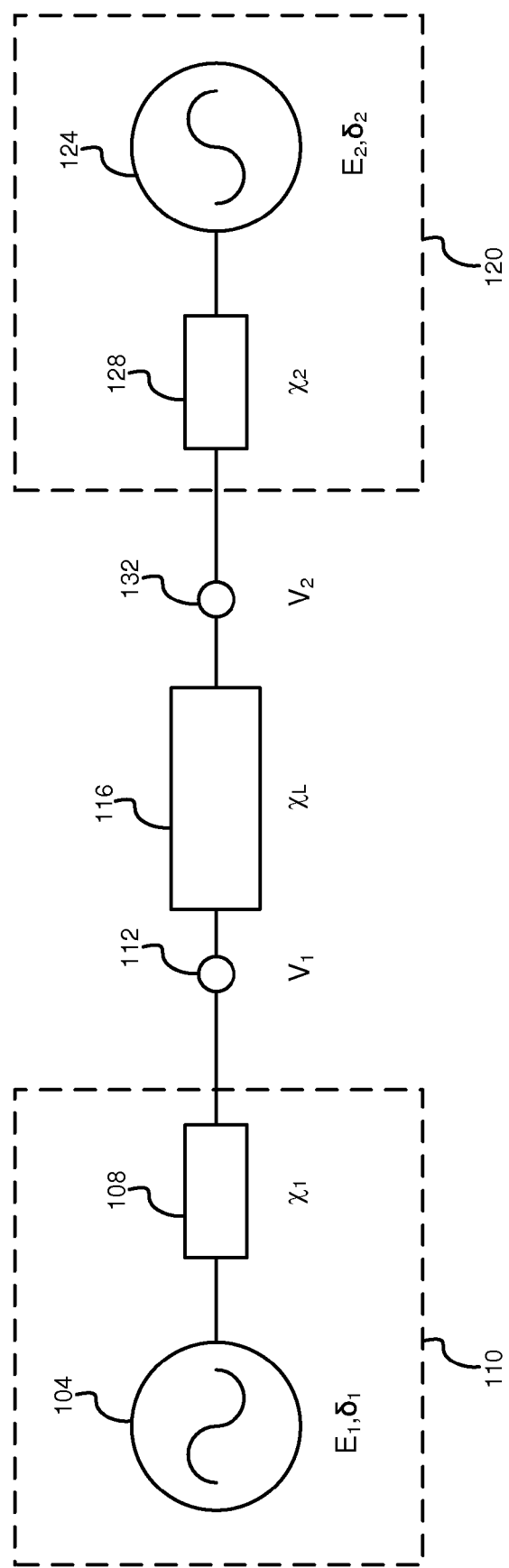
FIG. 8 is a simplified one-line schematic diagram of a power system with two power generators.

As mentioned above, the power angles of a plurality of generators on an electrical power system network can be beneficial in making power system protection, control, and automation decisions. A simplified network is illustrated in FIG. 8, which depicts a power network 800. A first generator 110 produces an internal excitation voltage $E_1$ and operates at a power angle $d_1$ as measured at the rotor of the generator 110. The first generator 110 has an internal reactance $X_1$ 108 in series with the voltage $V_1$ measured at the terminals 112 of generator 110. A second generator 120 produces an internal excitation voltage $E_2$ and operates at a power angle $d_2$ as measured at the rotor of the generator 120. The second generator 120 has an internal reactance $X_2$ 128 in series with the voltage $V_2$ measured at the terminals 132 of the generator 120. A network of load impedances 116 designated $X_L$ is powered by both generators. Connection of generators 110 and 120 to a load is well known in the art.

Both generators may have different stable operating ranges; i.e., their power angle curves (as illustrated in FIG. 2) may differ. When additional loads are switched onto the local electrical network, care must be taken to ensure that all affected generators will remain stable.

Turning again to FIG. 3, a plurality of generators 102a-102n are connected to the communications network 308 in a similar manner. For example, controller 228 is connected to the network 308 such that the power angle of the generator associated with the rotor 204 may be communicated over the network. Likewise, the power angles of generators 102a-102n are communicated over the network. Power angles from various generators on the electrical power network can then be gathered using a computer 321 connected to the network over link 310.

A comparison of the various power angles from the plurality of generators may then be made. Decisions of whether to add or shed loads, connect or disconnect generators, island a portion of the electrical network determine how close a generator is to its stability limits, and the like may be made depending on the power angles of the various generators. Power angles may also be used to determine a generator capacity, which is beneficial in deciding whether more load could be added. For example, if adding more load to the unconnected generators 104, 124 would be detrimental to the electrical network or generators, appropriate decisions could be made. Further, if a generator is to be connected to a loaded electrical network, the power angle of the generator may be compared with power angles of the generators connected to the electrical network to ensure that the connection of the additional generator would benefit the electrical network.

The network to which the generators and computer are connected may be any of various types available such as, for example, the world-wide web, a dial-up network, a local area network (LAN), a wide area network (WAN), and the like. Communication over the network may be made over various available means such as, for example, over fiber optic lines, metal cables, radio transmission, and the like. Communication over the network may follow one of various known protocols such as, for example, IEC-61850, Modbus, DNP3, SEL Fast Message, MirroredBits® (available from Schweitzer Engineering Laboratories, Inc, Pullman, Wash., and as described in U.S. Pat. Nos. 5,793,750 and 6,947,269, incorporated herein by reference), IEEE C37.118, and the like.

Figure 3:
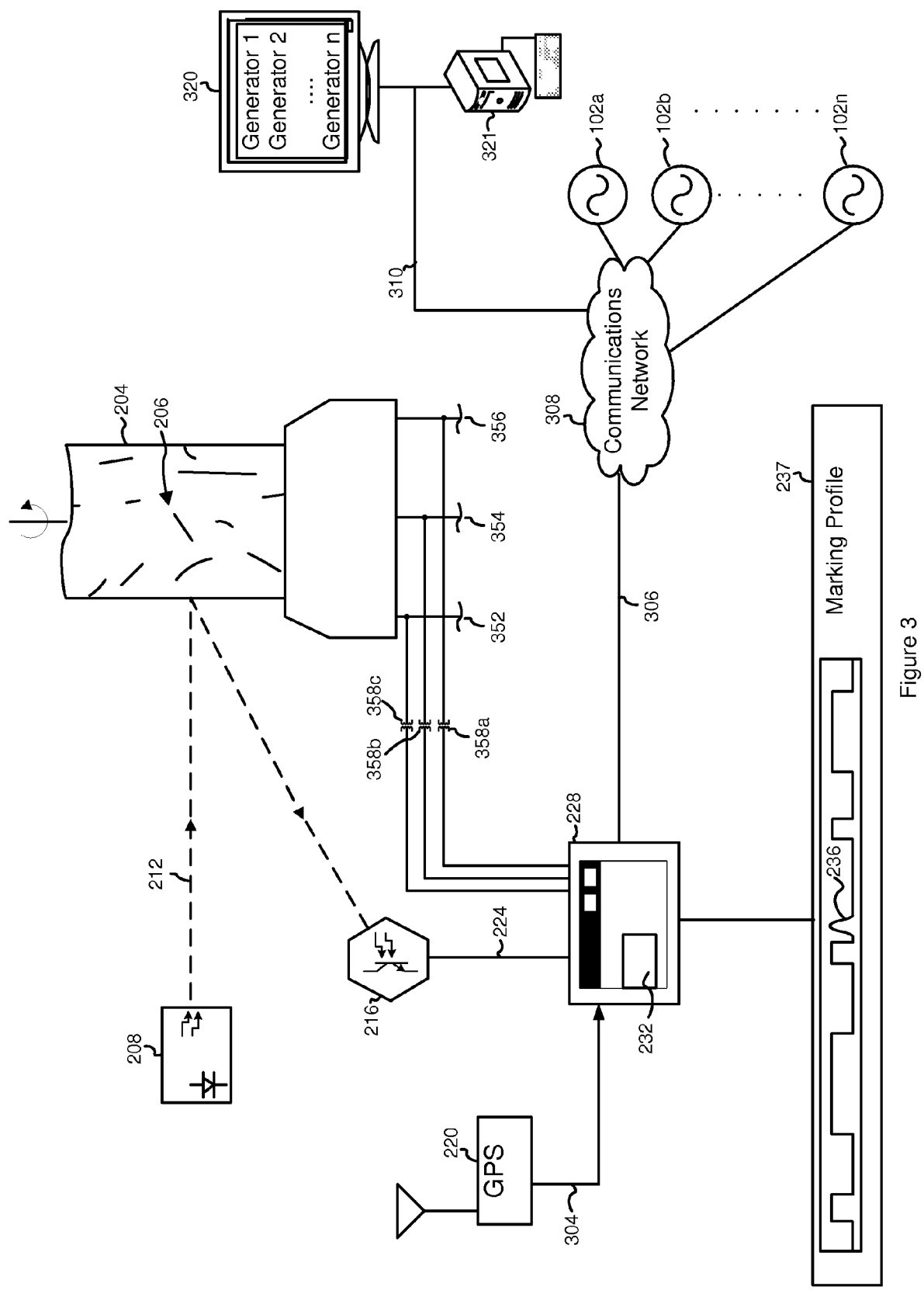
FIG. 3 is a simplified functional block diagram of a generator system.

For the comparison of the various power angles from the plurality of generators to be more accurate, each power angle may be associated with a time stamp ("time stamped") of a common time reference. The common time reference may be available to controllers such as controller 228 so that the controllers can associate a time stamp to the calculated power angle from each generator. Further, the controller 228 may assign a time stamp with the rotor pulse and with the zero-crossing such that this time-stamped data may be shared over the communications network. The common time reference is a time reference that is common to the devices on the network such that all may either operate at coordinated times and/or stamp communications with a common time for proper comparison and ordering of the communications. The common time reference may be provided to the devices via, for example, a global positioning system (GPS) using an IRIG-B format. FIG. 3 illustrates a system where the common time reference is provided using GPS through a GPS receiver 220 connected to the controller 228 using line 304.

The computer 321 may include software that allows the user to visualize the network as well as the power angles of the plurality of generators whether or not connected to the network. The software may also be adapted to allow a user to control certain aspects of the electrical power network such as opening or closing circuit breakers (to add or shed loads, or cause islanding of certain portions of the electrical power network, for example), connecting or disconnecting the generators from the electrical power system, change exciter voltage, affect taps of a voltage regulator, operate a capacitor bank, and the like.

FIGS. 9A through 9D illustrate an embodiment of the present invention used to determine the relative power angles of several generators on an electrical power system 900. The power system 900 includes various generators 902, 904, 906, and 908 connected to a common power system 910. Each generator is interconnected via conductors 910, 916, and 918 and/or a bus 912, 914. In this system, instead of measuring the shift of the rotor pulse as it relates to a zero crossing, the shift is measured against a common time-referenced sample.

Figure 9A:
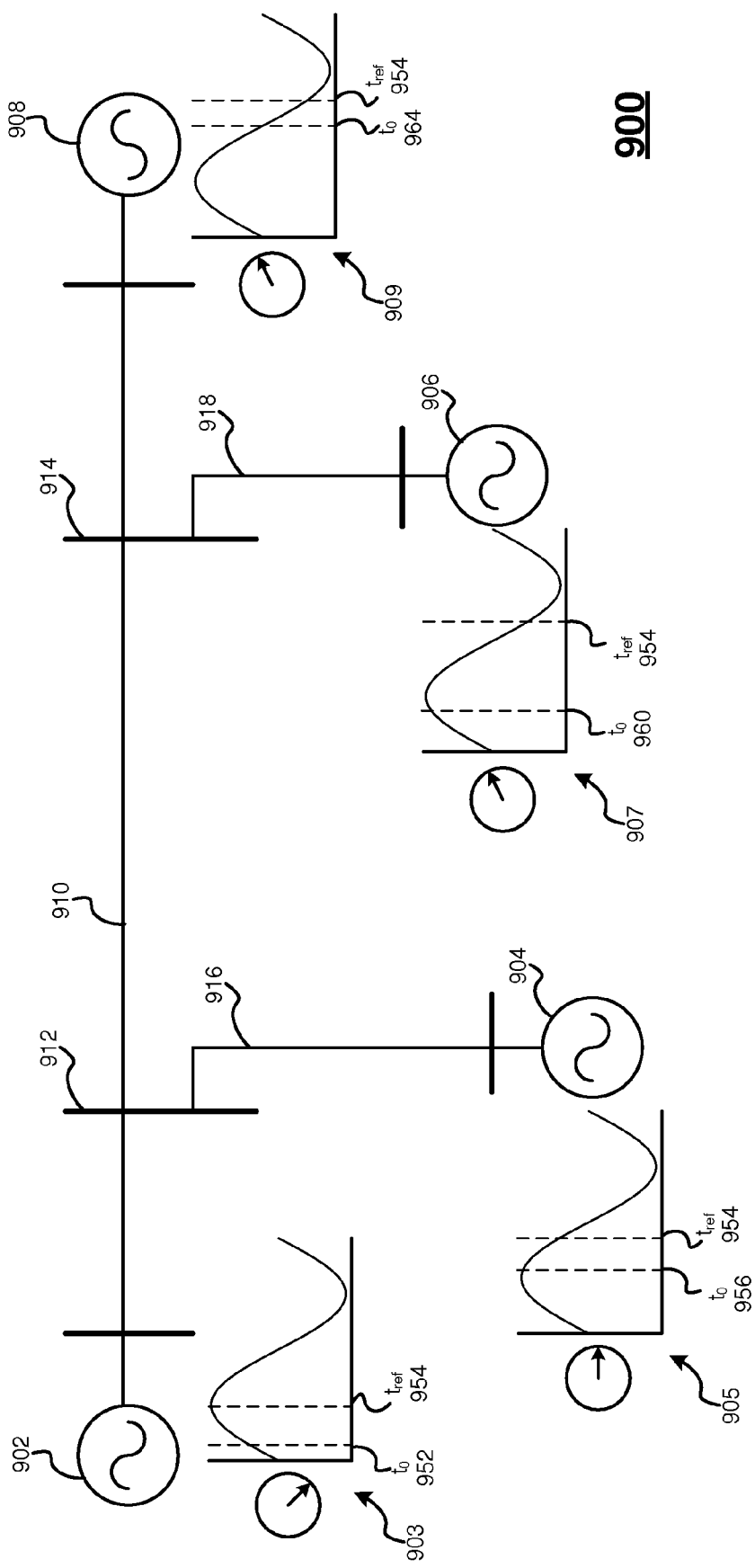
FIG. 9A is a one-line diagram of an electric power system illustrating relative power angle determination using time-synchronized phasor data.

In particular, as can be seen from FIG. 9A, a sample waveform diagram and phasor are shown for each generator. The waveform and phasor for generator 902 is illustrated at 903, those for generator 904 is illustrated at 905, those for generator 906 is illustrated at 907, and those for generator 908 is illustrated at 909. As samples are taken from the waveforms corresponding to each generator, the phase angle and magnitude are calculated, the time between the sample time and the last rotor pulse is determined, and this data is time-stamped and communicated to, for example, computer 321. The time-stamped data from each generator 902, 904, 906, and 908 are then time aligned such that the phase angle and magnitude and time between the sample time and the last rotor pulse is determined can be compared. For example, as shown in FIG. 9A, this data for a particular instant in time is illustrated and can be compared.

The phasor and waveform data 903 from generator 902 taken at reference time 954 indicates a particular phase angle and magnitude as well as a time between the last rotor pulse 952 and the reference time 954. Likewise, the phasor and waveform data 905, 907, and 909 from generators 904, 906, and 908 taken at reference time 954 indicate particular phase angles and magnitudes as well as times between the last rotor pulse 956, 960, and 964 and the reference time 954, respectively. This data may be used to determine the power angles of each individual generator as well as relative power angles between generators. That is, for each generator during OCC the time between a reference time 954 and the rotor pulse 952 is measured ($\Delta_0$). When load is added, the time between the reference time 954 and the rotor pulse 952 is again measured ($\Delta_1$). As described above, $\Delta_0$ and $\Delta_0$ can be used to determine the power angle of each generator. The power angle of each generator may be compared with the power angles of certain of the other generators such that the relative power angles between each of the generators may be monitored.

Turning to FIG. 9A, to determine the power angle of generator A 902, the OCC time between the rotor pulse and a particular phase angle may be calculated. When load is added to generator A 902, the relative shift between the rotor pulse and the particular phase angle can be used to determine the power angle of generator A 902. That is, instead of using the time of the zero crossing as described above, another part of the signal waveform may be used.

Likewise, the relative power angles between generators may be monitored using the system and methods described herein. As described above, FIG. 9A illustrates an electric power system 900 including generators A, B, C, and D 902, 904, 906, 908. Using the time-stamped phasor and rotor pulse time information from each generator, relative power angles between the generators may be determined. For example, a relative shift between the rotor pulse 952 of generator A 902 and a particular reference point on the signal waveform from generator 908 may be determined. The reference point may be a zero crossing, the point of a particular angle, or the like. Using the methods described above, the shift may be used to calculate an angle between the rotor pulse 952 and the point on the signal waveform from generator 908. This angle may be monitored and/or used in protection, control, automation or metering of the electric power system 900.

Figure 9B:
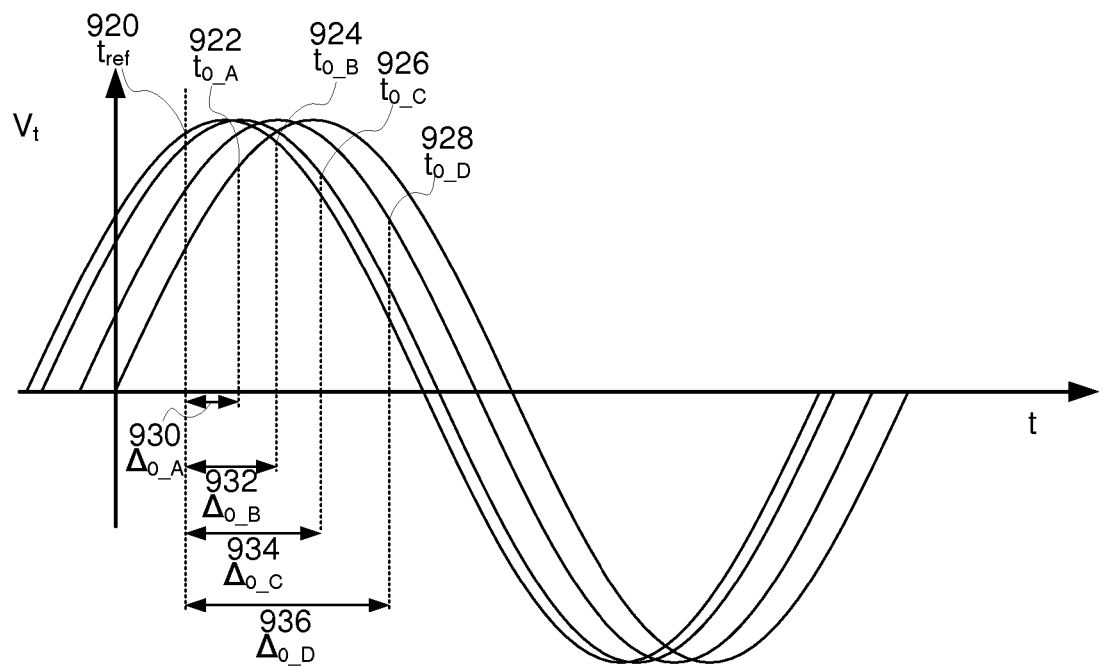
FIGS. 9B through 9D are graphs illustrating power angle determination for several generators; and, FIG. 10 is a flow chart illustrating power angle calculation for a system of generators.
Figure 9C:
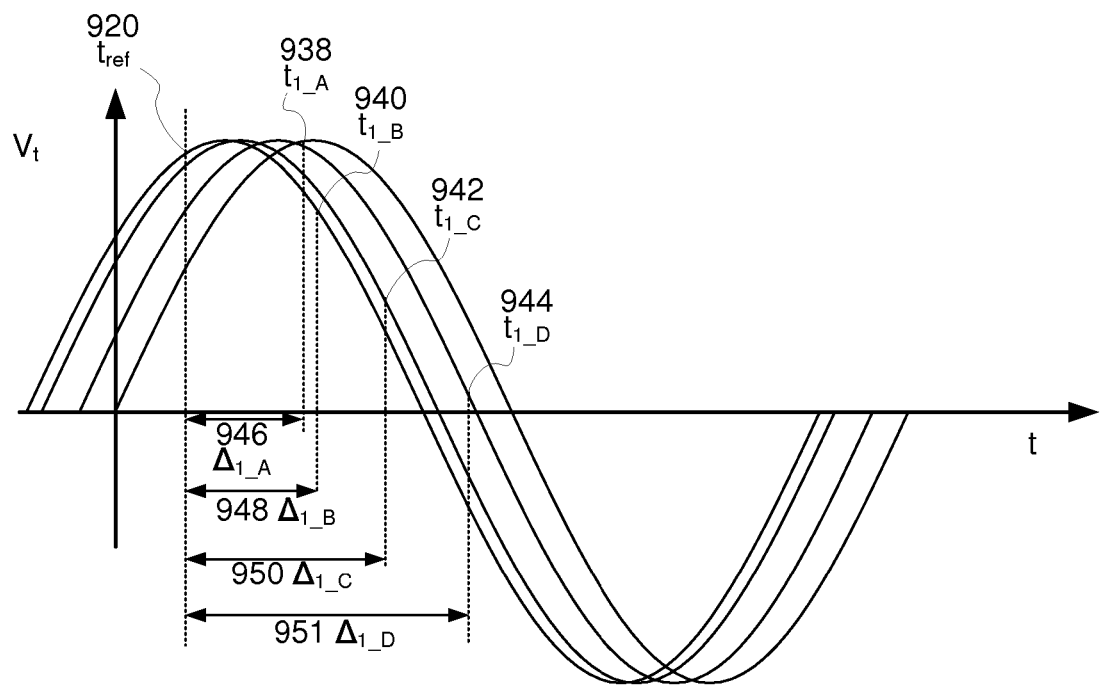
Figure 9D:
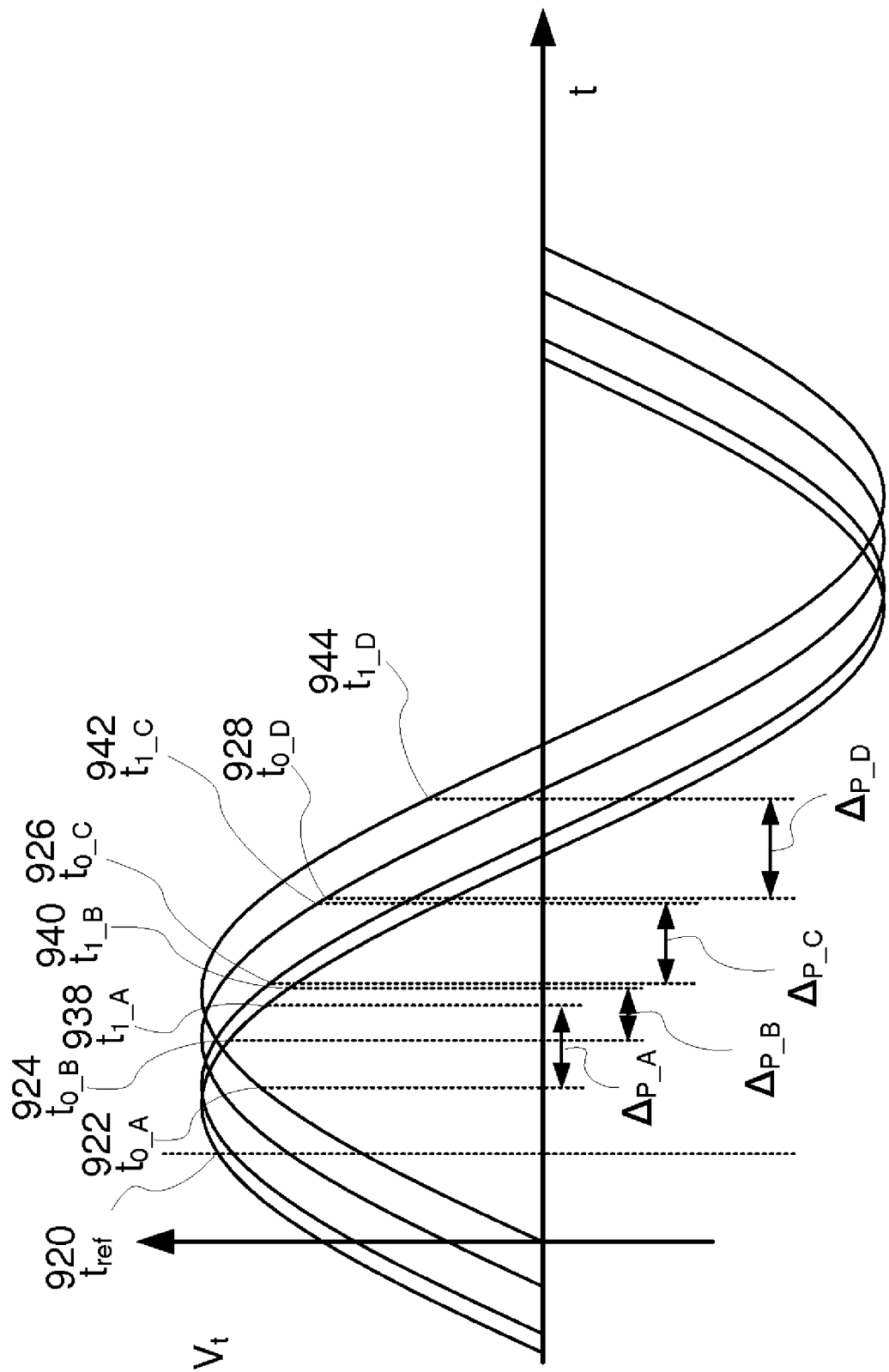

Calculating the power angles and relative power angles of the various generators of the electric power system 900 is illustrated in FIGS. 9B through 9D. As with FIG. 4, FIG. 9B shows an OCC. However, the signal waveforms of each of generators A, B, C, and D are shown. The reference time 920 is provided, and the time of each of the rotor pulses $t_{0\_A}$ 922, $t_{0\_B}$ 924, $t_{0\_C}$ 926, $t_0^{\ D}$ 928 is recorded. The time differences $\Delta_{0\_A}$ 930, $\Delta_{0\_B}$ 932, $\Delta_{0\_C}$ 934, and $\Delta_{0\_D}$ 936 between the reference time 920 and the rotor pulses $t_{0\_A}$ 922, $t_{0\_B}$ 924, $t_{0\_C}$ 926, $t_{0\_D}$ 928 are calculated for each generator. In FIG. 9C, load is added to each of the generators and the time differences $\Delta_{1\_A}$ 930, $\Delta_{1\_B}$ 932, $\Delta_{1\_C}$ 934, and $\Delta_{1\_D}$ 936 between the reference time 920 and the rotor pulses under loaded conditions $t_{1\_A}$ 922, $t_{1\_B}$ 924, $t_{1\_C}$ 926, $t_{1\_D}$ 928 are calculated for each generator.

Power angles of each of the generators can be determined over time using the newly generated time differences $\Delta_{P\_A}$, $\Delta_{P\_B}$, $\Delta_{P\_C}$, and $\Delta_{P\_D}$. Over time, the relative power angles between each of the generators may be monitored, and protection or control decisions may be made depending on the relative power angles. For example, load shedding decisions may be made depending on the relative power angles between the generators.

Though particular methods of sharing power angles over a network are described, various others are possible using the system and methods herein. For example, in FIG. 9A the power angle between various generators may be compared as long as the rotor angle monitor of each generator has a particular time reference. For example, that time reference may be a Start of Second available from the common time source (such as, for example, a particular bit of an IRIG-B time signal from a GPS). Computers connected to each generator could measure the time between the rotor pulse and the second of century (as defined, for example, in IEEE Standards 1344 or 1588, herein incorporated by reference in its entirety), and compare the relative shift of this time between generators. The comparison is performed by sharing time-stamped information between the generators (using, for example, time-stamped phasor data) as described herein.

It should be noted that there are several available reference times in such a network. In one example, a reference time 954 corresponds with a common time (such as may be available from a GPS, as discussed further herein). The common time may provide a reference time signal such as a top-of-second or second-of-century time signal throughout the network, either of which may be used as the reference time. Another available reference time is a sample signal that may be provided by a monitoring device on the network. In such an example, the monitoring device provides a signal indicating that such samples are to be taken. Further, the reference time may be a zero crossing of a sampled waveform from one of the generators. Likewise, the reference time may be a particular phase angle of the signal waveform from a particular generator. The reference time may be a rotor pulse from one of the generators.

Figure 10:
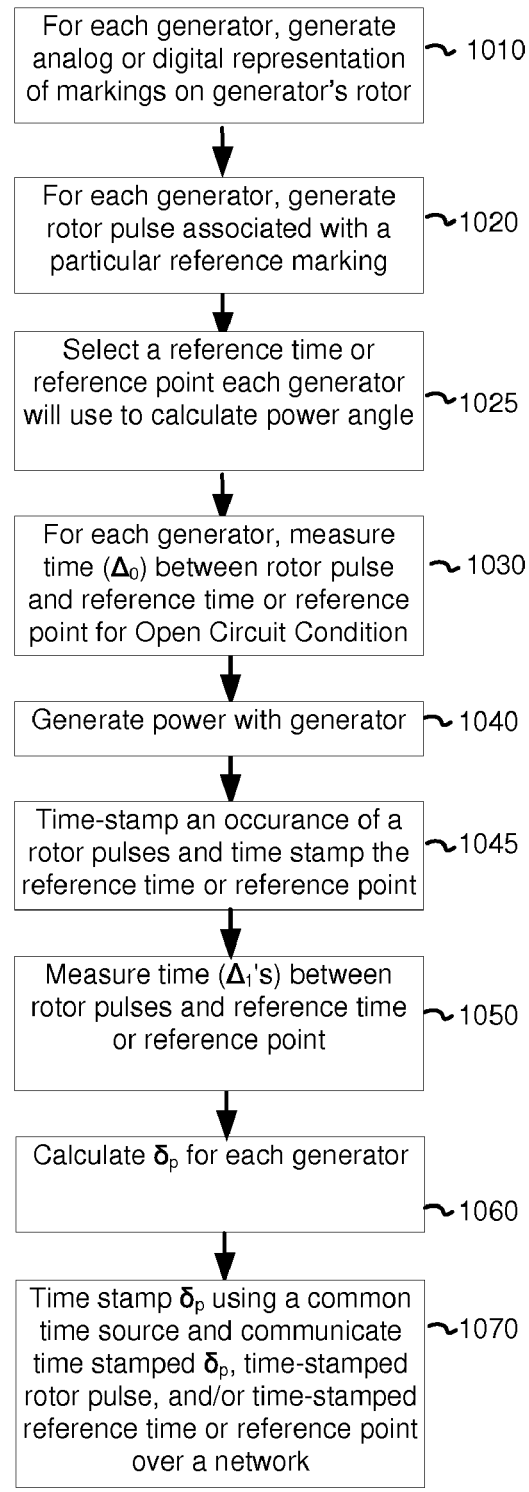

FIG. 10 illustrates a flow chart of a method for determining the power angle of generators on an electric power system. As described above, the system generates an analog or digital representation (marking profile) of markings on the selected circumferential section of a generator rotor 1010 for each generator. For each generator, a reference mark is selected from within the marking profile, and a rotor pulse that is associated with the detection of that reference mark is generated for each rotation of the rotor 1020, and may be time-stamped using the common time reference. For the system, a reference time or reference point is selected 1025. As described above, a number of particular reference times or points are available such as the zero-crossing of a signal waveform from a particular generator, a particular sample time, a rotor pulse from a particular generator, a particular repeating point in time from a time source, a particular angle of a signal waveform from a particular generator, and the like. Each occurrence of the reference time or reference point may be time-stamped. Each generator may have its own unique reference time such as a zero crossing from each generator.

Throughout, the period of rotation of the rotor is measured for each rotation of the rotor using, for example, the rotor pulse. The period may be measured by measuring the time between rotor pulses. In the example where the reference pulse and the rotor pulse are time stamped, the time between the reference pulse and the rotor pulse may be calculated using subtraction. Alternatively, a timer may be started when either the reference pulse or the rotor pulse occurs, and end when the other of the reference pulse and the rotor pulse occurs, resulting in the time between the rotor pulse and the reference pulse. For each generator, during OCC, the time between the rotor pulse and a reference point (either positive-slope or negative-slope) is measured 1030, and the period of rotation for this time is measured and recorded. Alternatively, and as discussed above and in conjunction with FIG. 9A, a reference point on a signal waveform other than a zero crossing (such as a sample time) may be used. The generators are then connected to a load such that power is generated 1040. The rotor pulse and the reference point or reference time can be time stamped 1045. The time between the rotor pulse and the reference point or reference time is measured 1050, and the period of rotation is also measured and recorded. As above, in the example where the reference point or time and the rotor pulse are time stamped, the time between the reference point or time and the rotor pulse may be calculated using subtraction. Alternatively, a timer may be started when either the reference point or time or the rotor pulse occurs, and end when the other of the reference point or time and the rotor pulse occurs, resulting in the time between the rotor pulse and the reference point or time. The power angles $d_p$ for each generator are then calculated using the recorded times and periods of rotation 1060. As described below, the power angle may be time stamped with a common time and shared across a network 1070. Further, the time-stamp of the rotor pulse, the time stamp of the reference point or time may also be shared over the network.

Thus, the change of the power angles of each generator with reference to the reference time or point may be monitored and used to make power system decisions. For example, if a zero crossing from generator A 902 in FIG. 9A is used as the reference point, then the power angle of generator A 902 may be calculated and monitored, and the power angles of each of generators B 904, C 906, and D 908, relative to generator A 902 may be calculated and monitored. When the power angle of any of the generators relative to generator A indicates a problem on the electric power system 900, actions may be taken such as shedding loads, disconnecting generators, and the like.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

For example, though the rotor displacement monitor described herein is described as being used on an electrical power generator, it is to be understood that the monitor may be used to monitor the angular rotation of several types of equipment with rotors such as, for example, motors, transmissions, drills, and the like. Several rotor displacement monitors may be used to monitor angular positions of a single rotor at various points along the rotor. For example, a transmission rotor may have a length such that axial torsion occurs when a mechanical angular resistance is placed on the rotor. A rotor displacement monitor of the present invention may be placed at both ends of the rotor to monitor the degree of angular torsion in the rotor.

The present power angle monitor can further be used to calculate a power system frequency. This system uses a mechanical means (the rotor angle monitor) to calculate the rotational speed of a particular generator. For example, for a synchronous generator the electrical frequency (in Hz) can be calculated using the number of poles and the rotational speed of the rotor:

Frequency of a signal waveform (such as a current or a voltage waveform) may be used by various power system protection, control, monitoring and automation schemes. The frequency as calculated using the system herein may be used in these schemes. For example, the actual power system frequency is used in the correction of voltage or current phasors where the signal waveform is sampled at a rate corresponding with a frequency that is different from the actual frequency of the signal waveform, as discussed in U.S. Pat. No. 6,934,654. Further, the actual signal waveform frequency is needed for resampling a waveform signal for measuring voltage or current phasors. For example, U.S. Pat. Nos. 6,662,124 and 6,845,333 describe methods and systems including a frequency estimation circuit. The system and method of the present invention could be used in place of the frequency estimation circuit.

What is claimed is:

1. A system for monitoring the angular displacement of a rotor of an electrical power generator, comprising:
   a first electric power generator comprising
      a rotor including a marking, and
      terminals in electrical communication with the generator, to provide a first signal waveform from the generator;
   a light source to direct a beam of light toward the rotor;
   an optical sensor adapted to detect reflections of the beam of light from the rotor; and,
   a controller in electrical communication with the terminals and the optical sensor to generate a marking profile including a record of a signal from the detected reflections of the beam of light, and to generate a rotor pulse when the optical sensor detects a reflection corresponding with the marking;
   wherein the controller further calculates a power angle using a time difference between the rotor pulse and a reference point on a second signal waveform from a second electric power generator under no load and load conditions.

2. The system of claim 1, wherein the controller comprises a time input and is adapted to determine a period of rotation of the rotor using the time input and the rotor pulse.

3. The system of claim 1, wherein the controller comprises a time input and is adapted to record a first time between the rotor pulse and a reference point on the first signal waveform received from the terminals.

4. The system of claim 3, wherein the reference point comprises a zero-crossing of the first signal waveform.

5. The system of claim 3, wherein the controller is adapted to record a first time between the rotor pulse and reference point for an open circuit condition, and the controller is adapted to record a second time for a second state where load is connected to the first generator.

6. The system of claim 5, wherein the controller is adapted to calculate a period of rotation of the rotor and calculate a power angle of the first electric power generator using the period of rotation, the first time, and the second time.

7. The system of claim 5, wherein the controller is further adapted to:
- calculate a first period of rotation corresponding with the first time;
- calculate a second period of rotation corresponding with the second time; and
- calculate a power angle of the first electric power generator using the first and second periods of rotation and the first and second times.

8. The system of claim 1, further comprising a common time source, and wherein the controller includes a common time source input and is adapted to time stamp the power angle using the common time source input.

9. The system of claim 3, wherein the controller further comprises a common time source input, and wherein the controller is adapted to calculate an angle of the first signal waveform, time stamp the reference point, the rotor pulse, and the angle.

10. The system of claim 1, further comprising a network for communicating power angles from a plurality of generators.

11. The system of claim 1, wherein the marking comprises a scratch on the surface of the rotor.

12. The system of claim 1, wherein the marking comprises an intentionally placed mark.

13. The system of claim 1, wherein the controller is adapted to generate the rotor pulse when the marking is detected in spite of additional marking on the rotor.

14. The system of claim 1, wherein the light source comprises one selected from the group consisting of: a laser, a light emitting diode generating visible light, a light emitting diode generating invisible light, and combinations thereof.

15. A method for detecting rotations of an electric generator with a rotating rotor that includes a reference mark thereon, comprising the steps of:
- directing a beam of light toward the rotor such that the beam of light may be reflected from the rotor;
- generating a marking profile including a record of a signal from detected reflections from the beam of light reflected from the rotor;
- detecting the reference mark on the rotor using light reflected from the rotor; and
- generating a rotor pulse when the reference mark is detected;
- detecting a signal waveform from a second generator;
- measuring a first time period between the rotor pulse and a reference point on the signal waveform when no load is connected to the generators; measuring a second time period between the rotor pulse and the reference point on the signal waveform when load is connected to the generators; and calculating a power angle using the first time period and the second time period.

16. The method of claim 15, wherein the step of detecting the reference mark on the rotor further comprises the step of recognizing a plurality of markings on the rotor including the reference mark.

17. The method of claim 15, further comprising the step of detecting a new mark on the rotor and updating the marking profile accordingly.

18. The method of claim 15, comprising the further steps of:
- measuring a first period of rotation of the rotor when no load is connected to the generator;
- calculating a first time between the rotor pulse and a reference point when no load is connected to the generator;
- measuring a second period of rotation of the rotor when a load is connected to the generator;
- calculating a second time between the rotor pulse and a reference point when a load is connected to the generator; and
- calculating a power angle of the generator using the first and second periods of rotation and first and second times.

19. The method of claim 15, further comprising the step of placing the marking on the rotor.

20. The method of claim 18, further comprising the step of assigning a time stamp to the power angle based on an input from a common time source.

21. The method of claim 18, further comprising the steps of:
- gathering power angles from a plurality of generators connected to a network; and,
- making a power system protection, control, or automation decision based on a comparison of the gathered power angles.

22. The method of claim 18, further comprising the steps of:
- calculating an angle of signal waveform generated by the generator;
- assigning a time stamp to the angle;
- assigning a time stamp to the rotor pulse;
- assigning a time stamp to the reference point of the signal waveform; and
- communicating the time stamped angle, rotor pulse and reference point to a communications network.

23. The method of claim 18, wherein the reference point is a point on a signal waveform generated by the generator.

24. The method of claim 23, wherein the reference point is a zero crossing of the signal waveform generated by the generator.

25. The method of claim 18, wherein the reference point is selected from the group consisting of: a point on a signal waveform generated by the generator; a point on a signal waveform generated by another generator; a reoccurring point in time; a sample signal on a network; a rotor pulse from another generator; and combinations thereof.

26. The method of claim 15, further comprising:
- measuring a first period of rotation of the generator with no load connected to the generators;
- measuring a second period of rotation of the second generator with no load connected to the generators;
- measuring a third period of rotation of the generator with load connected to the generators;

measuring a fourth period of rotation of the second generator with load connected to the generators; and wherein the step of calculating further comprises using the first, second, third, and fourth periods of rotation.

27. The method of claim 26, wherein the steps of measuring the second and fourth periods of rotation comprise the steps of:

directing a beam of light toward a rotor of the second generator such that the beam of light may be reflected from the rotor of the second generator, the rotor of the second generator including a reference mark thereon;

detecting the reference mark on the rotor of the second generator using the light reflected from the rotor;

generating a second rotor pulse when the reference mark is detected; and, calculating the time between the first and second rotor pulses.

\* \* \* \* \*